(12) United States Patent
Yang et al.

(10) Patent No.: US 7,953,222 B2
(45) Date of Patent: May 31, 2011

(54) METHOD AND APPARATUS FOR PARTIALLY ENCRYPTING SPEECH PACKETS

(75) Inventors: Hae Yong Yang, Daejeon (KR); Kyung Hoon Lee, Daejeon (KR); Sang Han Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 629 days.

(21) Appl. No.: 12/046,004

(22) Filed: Mar. 11, 2008

(65) Prior Publication Data

US 2009/0041231 A1    Feb. 12, 2009

(30) Foreign Application Priority Data

Aug. 10, 2007    (KR) .................. 10-2007-0080719

(51) Int. Cl.
*H04L 9/00* (2006.01)
(52) U.S. Cl. ......................................... 380/28; 380/269
(58) Field of Classification Search ................... 380/28, 380/267, 269, 270; 713/189, 193
See application file for complete search history.

(56) References Cited

U.S. PATENT DOCUMENTS

| | | | | |
|---|---|---|---|---|
| 5,790,527 A * | 8/1998 | Janky et al. | ................... | 370/330 |
| 5,914,941 A * | 6/1999 | Janky | ......................... | 370/313 |
| 2004/0077349 A1 * | 4/2004 | Barak et al. | ................... | 455/436 |
| 2004/0193871 A1 | 9/2004 | Seshadri | | |
| 2008/0026775 A1 * | 1/2008 | Arazi et al. | ................... | 455/462 |
| 2008/0189497 A1 * | 8/2008 | Hunter | ......................... | 711/162 |

FOREIGN PATENT DOCUMENTS

| | | |
|---|---|---|
| KR | 1020040017569 A | 2/2004 |
| KR | 1020040026315 A | 3/2004 |
| KR | 1020040104701 A | 12/2004 |

OTHER PUBLICATIONS

Chung-Ping Wu et al. "Fast Encryption Method for Audiovisual Data Confidentiality." SPIE International Symposium on Information Technologies 2000, (Boston, MA, USA), Nov. 2000. Proceedings of SPIE Vo. 4209, pp. 284-295.
Antonio Servetti et al. "Perception-Based Partial Encryption of Compressed Speech." IEEE Transactions on Speech and Audio Processing, Vo. 10, No. 8, Nov. 2002. pp. 637-643.

* cited by examiner

*Primary Examiner* — Beemnet W Dada
(74) *Attorney, Agent, or Firm* — Ladas & Parry LLP

(57) ABSTRACT

Provided are a method and apparatus for partially encrypting speech packets, more specifically, a method and apparatus for selecting partial encryption sets used for a partial encryption technique in which compressed speech packets are partially encrypted to obtain the same effect as a full encryption technique. The method includes the steps of: (a) compressing respective speech files stored in a large-capacity speech database into the speech packets using a speech codec; (b) measuring single-bit loss distortion and sequential-bit loss distortion of the speech packets compressed in step (a); (c) generating standards for selecting partial encryption sets based on the measurement results of the single-bit loss distortion and sequential-bit loss distortion; (d) selecting the partial encryption sets according to the generated standards; and (e) encrypting the speech packets using the selected partial encryption sets. In this method, distortion sensitivity caused by loss of a speech packet can be exactly measured in various embodiments so that partial encryption sets can be efficiently and securely selected based on the measurement result. As a result, by reducing the amount of encryption operation, encryption services can be applied in various wireless communication environments.

15 Claims, 8 Drawing Sheets

(Figure showing data layout tables across rows (a) through (e), with columns numbered 1 through 16, containing labels L0-L3, P0-P2, GA1/GB1/GA2/GB2, S1/C1, and S2/C2 with various numeric indices.)

METHOD AND APPARATUS FOR PARTIALLY ENCRYPTING SPEECH PACKETS

CROSS-REFERENCE TO RELATED APPLICATION

This application claims priority to and the benefit of Korean Patent Application No. 2007-80719, filed Aug. 10, 2007, the disclosure of which is incorporated herein by reference in its entirety.

BACKGROUND

1. Field of the Invention

The present invention relates to a method and apparatus for partially encrypting speech packets, and more particularly, to a method and apparatus for selecting partial encryption sets used for a partial encryption technique in which compressed speech packets are partially encrypted to obtain the same effect as a full encryption technique.

2. Discussion of Related Art

With the development of wireless communication technology and users' demand for mobility, low-power mobile terminals have been required more and more. Although wireless communication environments need higher security levels than wired communication environments, when encryption services that require large amounts of operations are applied to the wireless communication environments, the life spans of batteries of mobile terminals are shortened. This becomes more problematic in ultra low-power communication environments, such as wireless sensors and ad-hoc networks.

One of methods that have been proposed to overcome the problem of the encryption services is a partial encryption technique. According to the partial encryption technique, only information that is sensitive to human perceptual characteristics is extracted and encrypted instead of encrypting all compressed multimedia streams. The partial encryption technique has the same effect in information security as a full information encryption technique. Since the partial encryption technique can lessen the amount of information to be encrypted, the amount of encryption operation can greatly decrease. In the partial encryption technique, a partial encryption set refers to a combination of accumulated bits to be partially encrypted among compressed speech packets. Thus, selecting a partial encryption set having the smallest size within a range of ensuring security is the most essential to the partial encryption technique.

Figure 1:
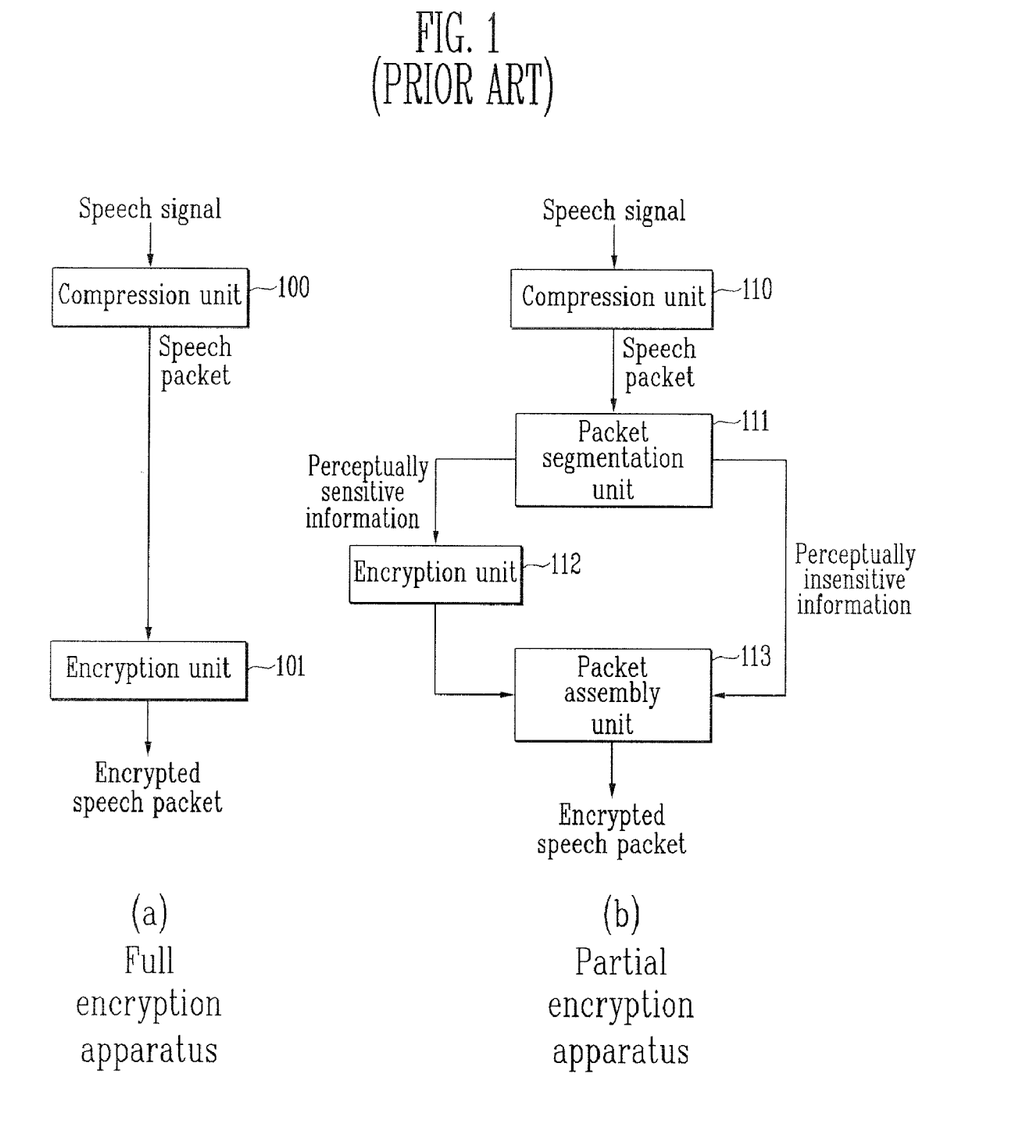
FIGS. 1A and 1B are block diagrams showing a conventional full encryption method and a conventional partial encryption method, respectively.

FIGS. 1A and 1B are block diagrams showing a full encryption technique and a partial encryption technique, respectively.

Referring to FIG. 1A, which illustrates a full encryption technique, a compression unit 100 compresses a speech signal into speech packets, and an encryption unit 101 encrypts the entire compressed speech packets to produce encrypted speech packets. In contrast, referring to FIG. 1B, which illustrates a partial encryption technique, a compression unit 110 compresses a speech signal into speech packets, and a packet segmentation unit 111 segments the compressed speech packets into perceptually sensitive information and insensitive information. Thus, an encryption unit 112 encrypts only the perceptually sensitive information. A packet assembly unit 113 reassembles the encrypted information and the unencrypted information to produce a partially encrypted speech packet. In the partial encryption technique, the packet segmentation unit 111 and the packet assembly unit 113 extract and reassemble the perceptually sensitive information based on a partial encryption set. The security and efficiency of the partial encryption technique depend on the partial encryption set.

A conventional technique related with the above-described secure and efficient partial encryption set is described by A. Servetti and J. C. De Martin, in "Perception-based partial encryption of compressed speech", IEEE Trans. Speech and Audio Processing, vol. 10, no. 8, pp. 637-643, November 2002. In this conventional technique, two partial encryption sets are selected for an ITU-T G.729 codec and the security of each of the two partial encryption sets is evaluated. On analysis of the evaluation results, a high-protection set that corresponds to 45% of the total bit stream exhibits the same security level as in a full encryption technique, and a low-protection set that corresponds to 30% of the total bit stream is capable of nearly removing the understanding of an encrypted speech signal.

Table 1 shows bits allocated to the ITU-T G.729 and the conventional partial encryption sets.

TABLE 1

| Parameter | Symbols | G.729 | High-protection set | Low-protection set |
|---|---|---|---|---|
| LSP | L0 | 1 | 0 | 0 |
|  | L1 | 7 | 7 | 5 |
|  | L2 | 5 | 5 | 3 |
|  | L3 | 5 | 0 | 0 |
| Pitch | P0 | 1 | 0 | 0 |
|  | P1 | 8 | 7 | 5 |
|  | P2 | 5 | 3 | 3 |
| Gain | GA1 | 3 | 3 | 2 |
|  | GB1 | 4 | 4 | 2 |
|  | GA2 | 3 | 3 | 2 |
|  | GB2 | 4 | 4 | 2 |
| Residue | S1 | 4 | 0 | 0 |
|  | C1 | 13 | 0 | 0 |
|  | S2 | 4 | 0 | 0 |
|  | C2 | 13 | 0 | 0 |
| Total number of bits |  | 80 bits | 36 bits | 24 bits |
| Encryption rate |  |  | 45% | 30% |

One frame of the G.729 codec consists of 80 bits, and the G.729 codec includes a line spectral pair (LSP) parameter, a pitch parameter, a gain parameter, and a residual parameter. As shown in Table 1, the conventional high-protection set consists of 45% of the 80 bits (or 36 bits), and the conventional low-protection set consists of 30% of the 80 bits (or 24 bits).

Conventionally, the high-protection set and the low-protection set are selected as follows. Initially, a set selected for an unequal error protection (UEP) method (hereinafter, a "UEP set") is cited and used as the high-protection set. The cited UEP set is selected by measuring objective and subjective speech qualities of each bit of the bit stream of the G.729 codec. Also, the low-protection set is selected via an informal listening test that is additionally programmed.

Although the above-described conventional technique provides the method of partially encrypting compressed speech packets and partial encryption sets, the partial encryption sets have the two following efficiency problems.

1. A Problem about a Difference in a Minimization Target Between the Partial Encryption Set and the UEP Set In order that the conventional high-protection set may be applied to a UEP method, the most sensitive bits are combined by measuring the objective and subjective speech qualities of a single bit to generate the high-protection set. The EUP method is a technique of further adding an error correction function to information sensitive to perceptual characteristics in a multimedia stream and less adding the error correction function to information insensitive to the perceptual characteristic so as to elevate the entire communication qualities in various loss environments. However, since the UEP set is different in uses from the partial encryption set, standards for selecting the UEP set and the partial encryption set should be different. The UEP method is directed to selecting bits sensitive to errors and protecting mainly the bits to minimize the degradation of the entire communication quality. In contrast, the partial encryption method is directed to maximizing distortion of a speech signal to minimize residual intelligence of a speech signal using the smallest partial encryption sets. Accordingly, the UEP method and the partial encryption method are aimed at minimizing the opposite targets. Due to the difference in the minimization target, it is necessary to improve the conventional partial encryption set as follows.

1) The UEP method must include a large portion of a packet in order to satisfy a speech quality threshold value, and a UEP set that consists of many bits includes too many residual components to be directly used as a partial encryption set. Thus, only a far smaller number of bits may be used to remove residual intelligence.

2) The UEP set is selected by measuring single-bit sensitivity on the assumption of low-loss environments. However, environments in which respective bits suffer from losses at the same time need to be considered in a high-loss environment, such as partial encryption.

2. A Problem about Criticality of a Parameter MSB

The conventional low-protection set is selected via an informal listening test that is additionally programmed to select a partial encryption set. However, a graphical user interface (GUI) of the program has a scroll bar for selecting the number of bits to belong to a partial encryption set for each parameter. The number of bits selected by the scroll bar corresponds to the number of bits of the corresponding parameter in a direction from a most significant bit (MSB) to a least significant bit (LSB). The number of bits is selected for each parameter on the assumption that the MSB of the parameter exhibits more loss distortion than the LSB of the parameter. However, each parameter of a speech codec is obtained using a vector quantization method and a quantization method peculiar to the speech codec instead of a simple scalar quantization method. For example, a G.729 codec uses various quantization methods shown in Table 2. Accordingly, the conventional assumption that an MSB is always more sensitive to loss than an LSB is erroneous, thus resulting in a reduction in the efficiency of the selected partial encryption set.

TABLE 2

| Parameter | Symbol | Quantization |
| --- | --- | --- |
| LSP | L0, L1, L2, L3 | Vector quantization |
| Pitch | P0 | Quantization peculiar to G.729 |
|  | P1 | Scalar quantization |
|  | P2 | Differential scalar quantization |
| Gain | GA1, GB1, GA2, GB2 | Vector quantization |
| Residue | S1, C1, S2, C2 | Quantization peculiar to G.729 |

SUMMARY OF THE INVENTION

The present invention is directed to a method and apparatus for partially encrypting speech packets, which select partial encryption sets efficiently and securely by exactly measuring distortion sensitivity in various environments so that high security is ensured using small partial encryption sets and the amount of encryption operation is greatly reduced.

One aspect of the present invention is to provide a method of partially encrypting speech packets. The method includes the steps of: (a) compressing respective speech files stored in a large-capacity speech database into the speech packets using a speech codec; (b) measuring single-bit loss distortion and sequential-bit loss distortion of the speech packets compressed in step (a); (c) generating standards for selecting partial encryption sets based on the measurement results of the single-bit loss distortion and sequential-bit loss distortion; (d) selecting the partial encryption sets according to the generated standards; and (e) encrypting the speech packets using the selected partial encryption sets.

Another aspect of the present invention is to provide an apparatus for selecting partial encryption sets of speech packets. The apparatus includes: a speech compression unit for compressing respective speech files stored in a large-capacity speech database into the speech packets using a speech codes; a distortion measurement unit for measuring single-bit loss distortion and sequential-bit loss distortion of the compressed speech packets; a partial encryption set selecting standard generation unit for generating standards which select partial encryption sets based on the results measured by the distortion measurement unit; a partial encryption set selection unit for selecting the partial encryption sets according to the generated standards; and an encryption unit for encrypting the speech packets using the selected partial encryption sets.

BRIEF DESCRIPTION OF THE DRAWINGS

The above and other features and advantages of the present invention will become more apparent to those of ordinary skill in the art by describing in detail exemplary embodiments thereof with reference to the attached drawings in which:

FIGS. 6A through 6E illustrate partial encryption sets selected according to an exemplary embodiment of the present invention.

DETAILED DESCRIPTION OF EMBODIMENTS

The foregoing and other objects, features and advantages of the invention will be apparent from the following more particular description of exemplary embodiments of the invention, as illustrated in the accompanying drawings.

Figure 2:
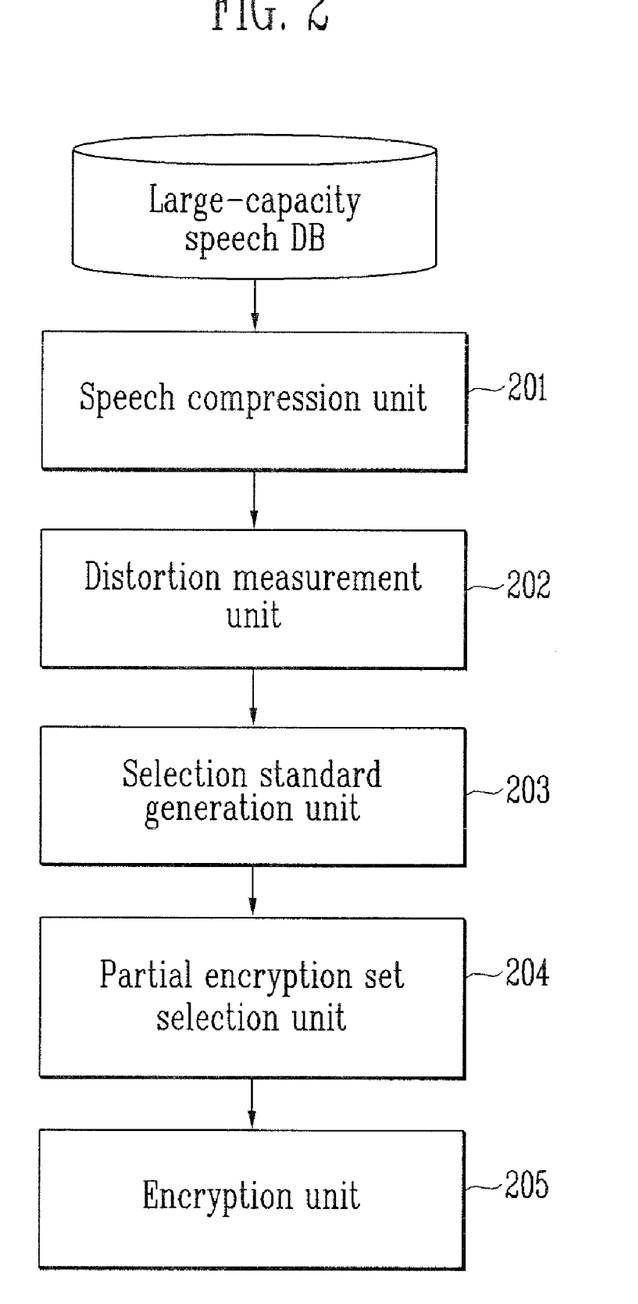
FIG. 2 is a block diagram of an apparatus for selecting partial encryption sets of speech packets according to an exemplary embodiment of the present invention.

FIG. 2 is a block diagram of an apparatus for selecting partial encryption sets of speech packets and partially encrypting the speech packets using the partial encryption sets according to an exemplary embodiment of the present invention.

Referring FIG. 2, a speech compression unit 201 compresses respective speech files stored in a large-capacity speech database (DB) into speech packets, and a distortion measurement unit 202 measures single-bit loss distortion and sequential-bit loss distortion of the speech packets compressed by the speech compression unit 201. The measurement of the single-bit loss distortion and sequential-bit loss distortion may be performed using perceptual evaluation of speech quality (PESQ) algorithm. A selection standard generation unit 203 generates standards for selecting partial encryption sets based on results of the single-bit loss distortion and sequential-bit loss distortion that are measured by the distortion measurement unit 202. The criticality of each parameter may be determined and reflected on the standards for selecting the partial encryption sets in consideration of not only the distortion measurement results but also the physical meanings of each of a plurality of parameters of a speech compression codec used for the speech files. A partial encryption set selection unit 204 selects partial encryption sets based on the standards, and an encryption unit 205 encrypts the speech packet using the selected partial encryption sets.

Hereinafter, a method of partially encrypting speech packets using the above-described apparatus will be described in more detail with reference to drawings.

Figure 3:
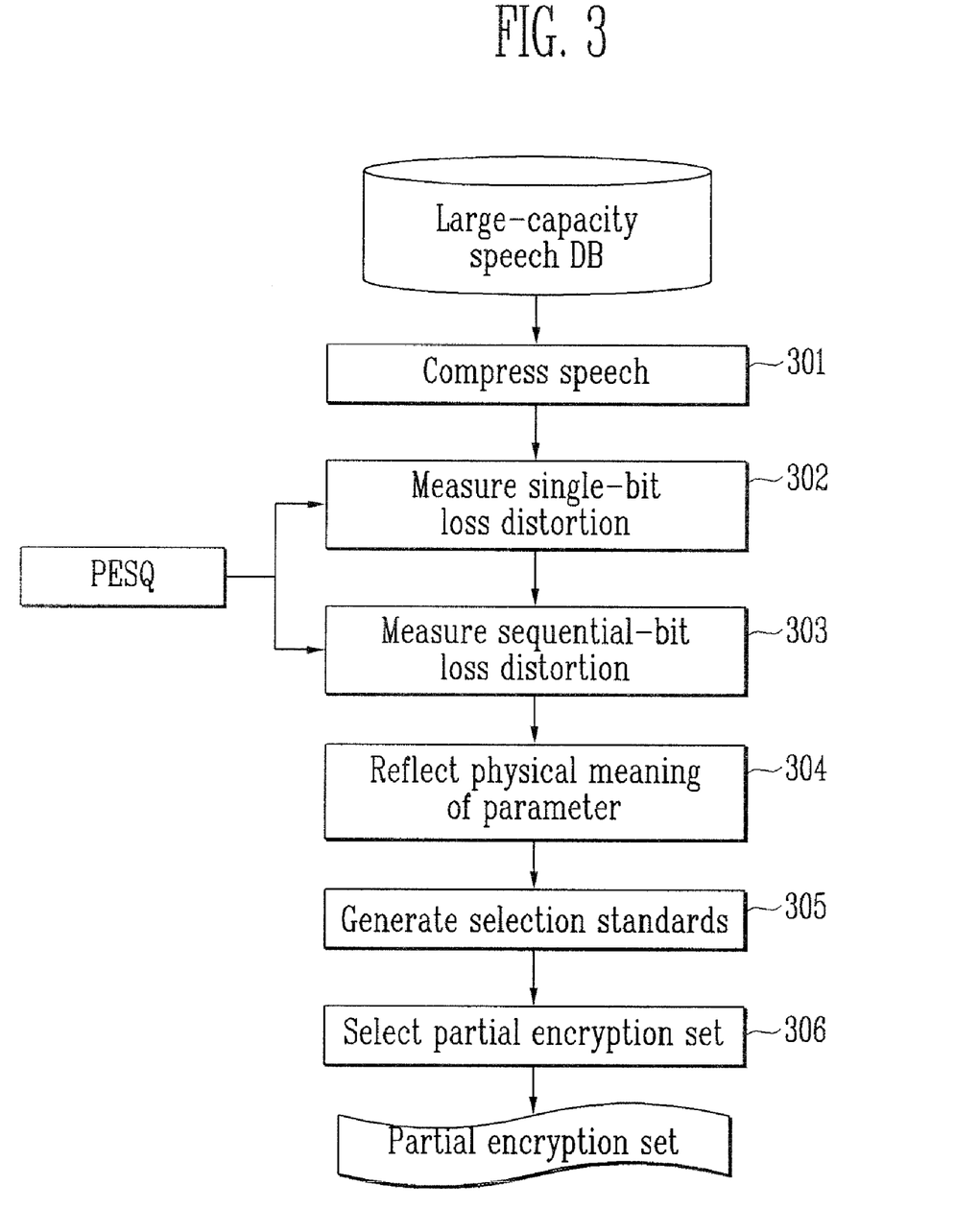
FIG. 3 is a flowchart illustrating a method of selecting a partial encryption set according to an exemplary embodiment of the present invention.

FIG. 3 is a flowchart illustrating a method of selecting partial encryption sets of speech packets according to an exemplary embodiment of the present invention.

Referring to FIG. 3, respective speech files, which are recorded by various speakers and stored in a large-capacity speech DB, are compressed into speech packets using a G.729 codec in step 301. According to an exemplary embodiment of the present invention, the speech DB is a Korean speech DB that stores speech files recorded by 32 men and 28 women, and the speech files are 16-bit mono speech files with a sampling frequency of 8 KHz.

Figure 4:
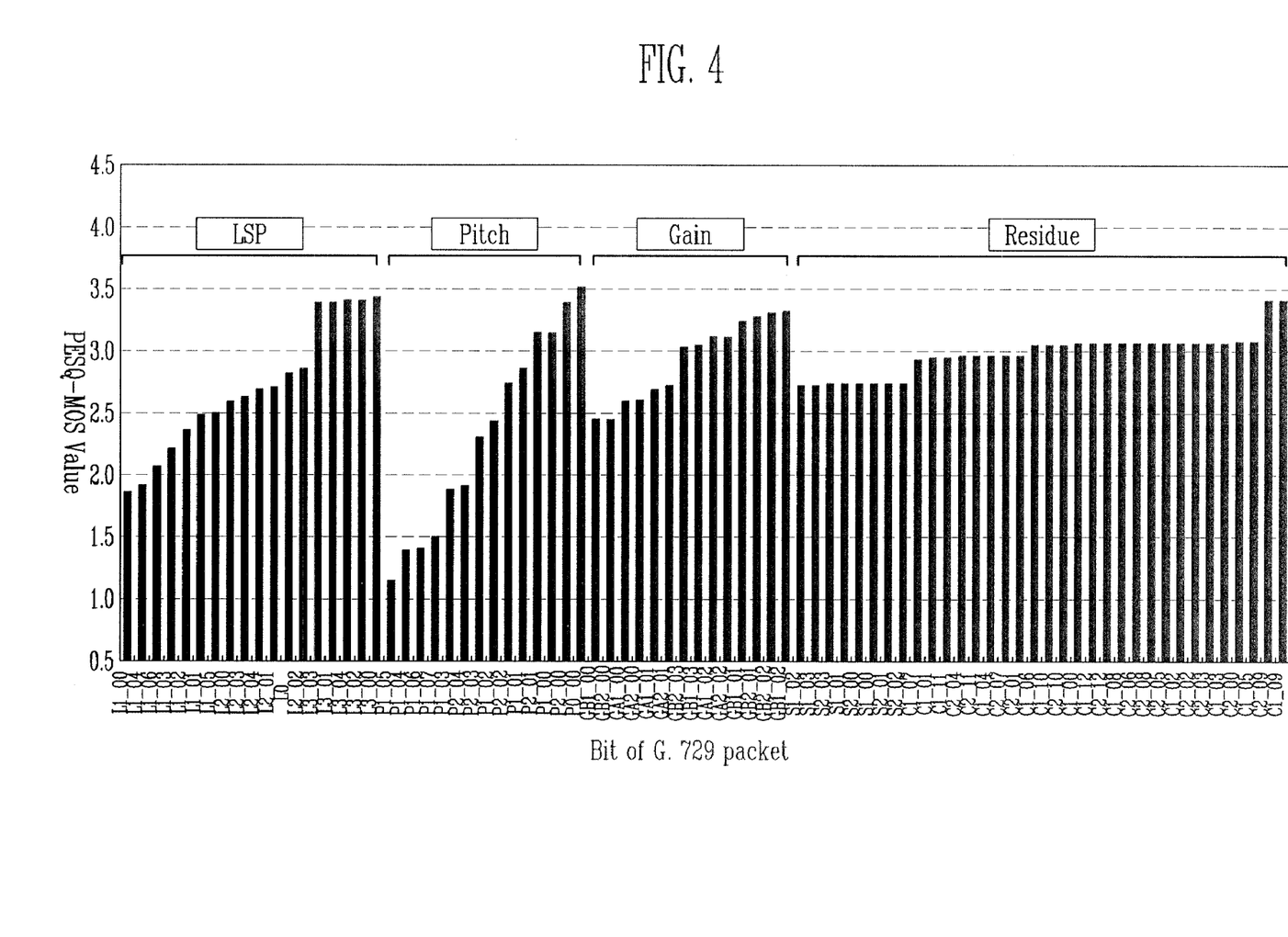
FIG. 4 is a graph showing single-bit loss distortion sensitivity for each bit of a speech packet according to an exemplary embodiment of the present invention.

In step 301, errors are forcibly put into each bit of the speech packet. In step 302, a lossless original speech file and a speech file with bit errors are input to PESQ algorithm, and the speech quality of the speech file with the bit errors is measured. FIG. 4 is a graph showing single-bit loss distortion sensitivity for each bit of the speech packet according to an exemplary embodiment of the present invention. In FIG. 4, a bit with a lower PESQ-MOS value is more sensitive to bit errors or encryption. Thus, it can be seen in FIG. 4 that a most significant bit (MSB) of a parameter is always less sensitive to bit errors or encryption than a least significant bit (LSB) of the parameter. For example, a bit L1_00 (an LSB of a parameter L1) is more sensitive to bit errors or encryption than bits L1_01 to L1_06. Therefore, from the results shown in FIG. 4, it can be concluded that the extent of single-bit distortion varies according to a parameter and is irrelevant to positions of the MSB and LSB. This result demonstrates the problem of a conventional art in which the number of bits of each parameter is selected on the assumption that the MSB of each parameter exhibits more loss distortion than the LSB of the parameter. Also, as shown in FIG. 4, the sensitivity of each parameter to loss increases in the order of a pitch parameter, a line spectral pair (LSP) parameter, a gain parameter, and a residual parameter.

Figure 5:
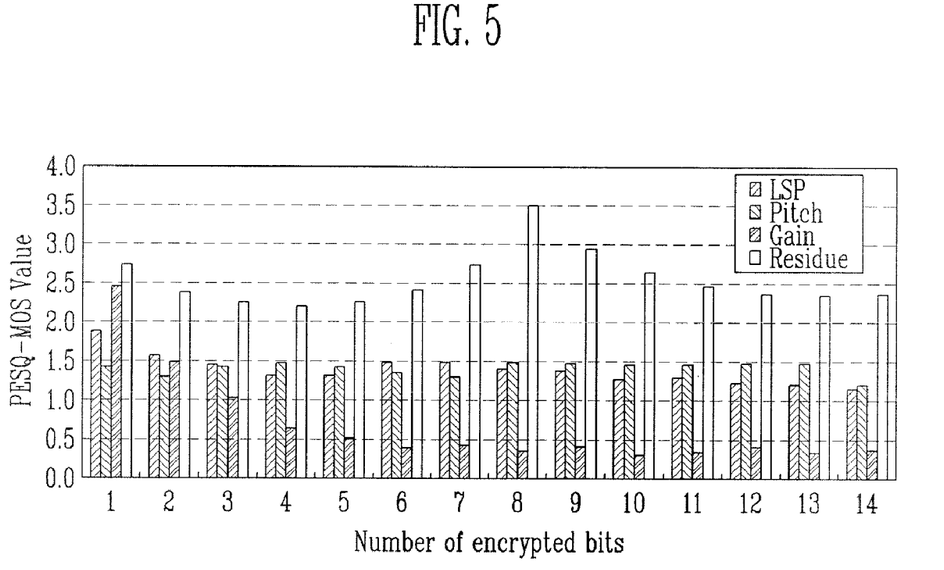
FIG. 5 is a graph showing sequential-bit loss distortion sensitivity for each parameter of a speech packet according to an exemplary embodiment of the present invention.
Figure 7:
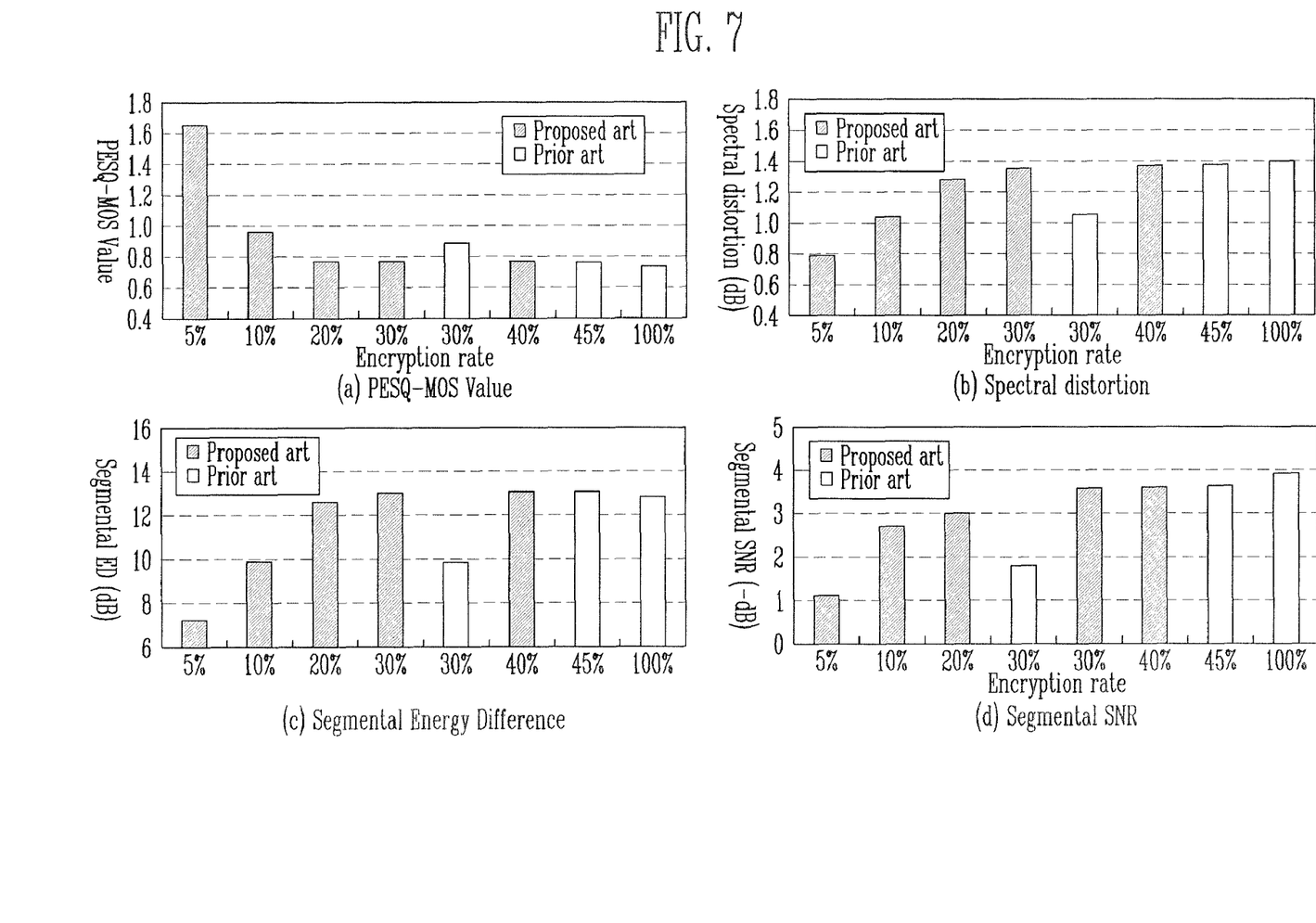
FIGS. 7A through 7D are graphs showing measurement results of objective distortion using selected partial encryption sets according to an exemplary embodiment of the present invention.
Figure 8:
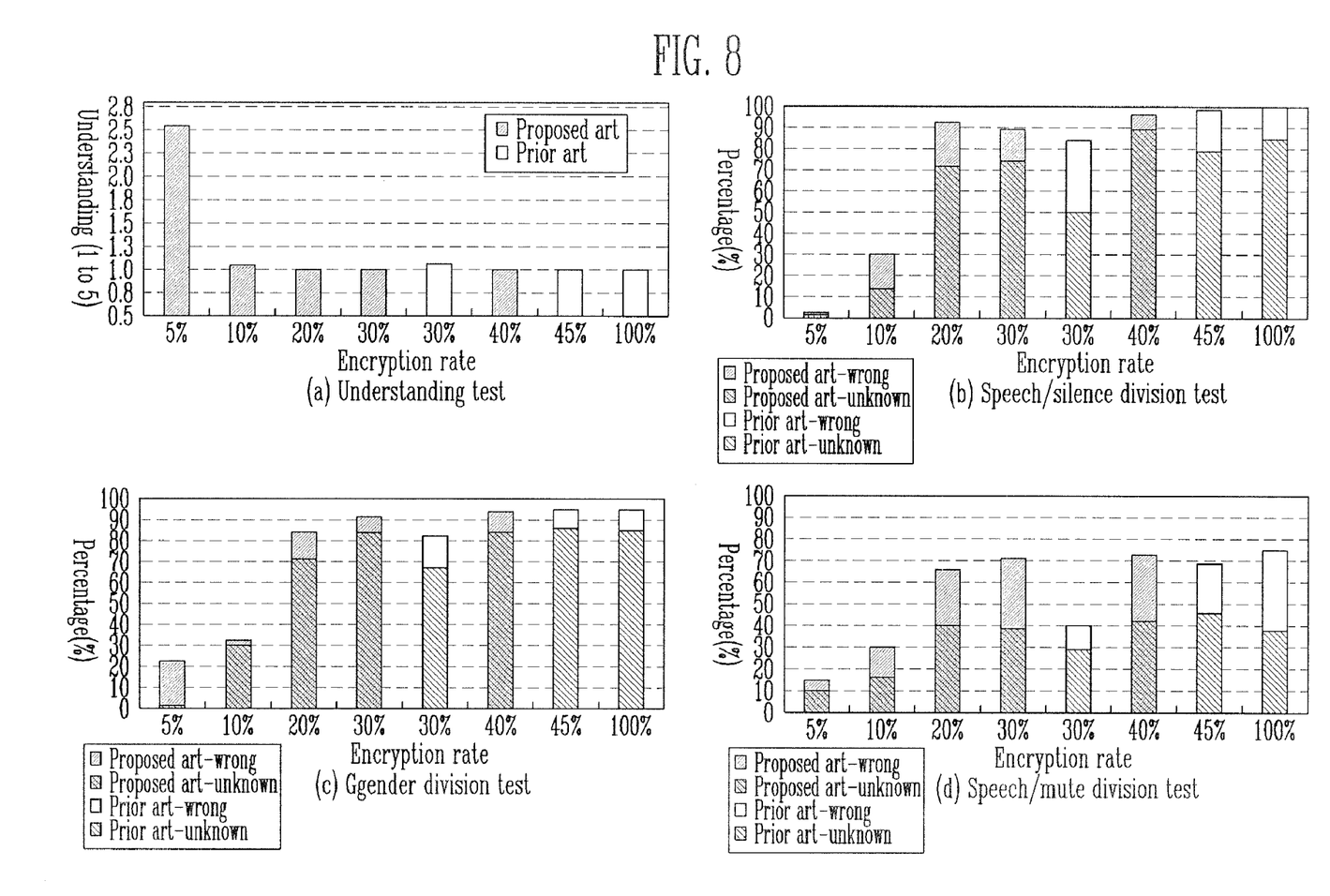
FIGS. 8A through 8D are graphs showing results of subjective listening experiments using selected partial encryption sets according to an exemplary embodiment of the present invention.

In step 303, while collecting the most distorted bits of each parameter and increasing the number of the collected bits, sequential-bit loss distortion is measured using PESQ algorithm. For example, in the case of the LSP, the distortions of one bit L1_00, two bits L1_00 and L1_04, and three bits L1_00, L1_04, and L1_06 are measured in sequence. FIG. 5 is a graph showing sequential-bit loss distortion sensitivity for each parameter of a speech packet according to an exemplary embodiment of the present invention. Referring to FIG. 4, which shows the measurement result of single-bit loss distortion, the pitch has the highest loss distortion. However, referring to FIG. 5, which shows the measurement result of sequential-bit loss distortion, distortion increases in the order of a gain parameter, an LSP parameter, a pitch parameter, and a residual parameter. As a result, it can be confirmed that the conventional method of measuring only single-bit sensitivity in a low-loss environment is problematic. Also, it can be seen that, on the assumption of a high-loss environment, such as partially encryption, it is necessary to measure distortion in the event of simultaneous losses of respective bits.

Since each parameter of a speech codec has a significant physical meaning based on a speech production model, the physical meaning of each parameter is reflected on the standards for selecting the partial encryption sets in step 304. In the speech codec, an LSP parameter is a filter coefficient for modeling the motion of a human vocal tract so that information used for dividing speech in syllables can be modeled using the LSP parameter. A pitch parameter is a filter coefficient for modeling the motion of a human vocal cord and varies according to the speaker's gender or tone. A gain parameter contains information on the accent of speech, namely, information on the intelligibility and naturalness of a speech signal. Finally, a residual parameter is used to model a residual speech component, which is not modeled by the LSP and pitch parameters, and takes up the largest portion of the compressed speech packet for the sake of the naturalness of the speech signal. On analysis of the physical meanings of the respective parameters, it can be seen that the gain parameter containing information on the intelligibility and naturalness of the speech signal is most critical, and the LSP and pitch parameters are also critical because they may expose specific information on the speech signal. However, since the residual parameter includes a series of impulses, the residual parameter does not provide any information to an attacker by itself, so that encrypting the residual parameter may be unnecessary. Accordingly, the encryption of the gain, LSP, and pitch parameters as critical parameters needs to be considered.

The criticality of each parameter is determined in consideration of the measurement results of single-bit loss distortion and sequential-bit loss distortion and the physical meanings of the respective parameters. Thus, standards for selecting partial encryption sets are generated based on the criticality of each parameter in step 305.

The standards for selecting the partial encryption sets according to an exemplary embodiment of the present invention are as follows.

1. The gain, LSP, and pitch parameters are all included.
2. Among the gain, LSP, and pitch parameters, the largest number of bits are allocated to the gain parameter and the smallest number of bits are allocated to the pitch parameter.
3. A more distorted bit is allocated to each parameter earlier than a less distorted bit using the measurement result of single-bit loss distortion.
4. More bits are allocated to the gain parameter in the case of a small partial encryption set.

In step 306, partial encryption sets are selected based on the standards generated in step 305. In an exemplary embodiment of the present invention, five partial encryption sets Class 1 to Class 5 are selected. In the current embodiment, Table 3 show bits allocated to the selected partial encryption sets Class 1 to Class 5, and FIGS. 6A through 6E illustrates the locations of bits allocated to the partial encryption sets Class 1 to Class 5, respectively. In FIG. 6, ash-colored bits denote the partial encryption sets Class 1 to Class 5 to be partially encrypted.

TABLE 3

| | Bit allocation | | | Total number | Encryption |
|---|---|---|---|---|---|
| | LSP | Pitch | Gain | of bits | rate |
| Class1 | 1 bit | 1 bit | 2 bits | 4 bits | 5% |
| Class2 | 2 bits | 2 bits | 4 bits | 8 bits | 10% |
| Class3 | 5 bits | 4 bits | 7 bits | 16 bits | 20% |
| Class4 | 8 bits | 6 bits | 10 bits | 24 bits | 30% |
| Class5 | 11 bits | 9 bits | 12 bits | 32 bits | 40% |

FIGS. 7A through 7D are graphs showing measurement results of objective distortion using the five selected partial encryption sets Class 1 to Class 5 shown in Table 3, and FIGS. 8A through 8D are graphs showing results of subjective listening experiments on various listeners using the selected partial encryption sets Class 1 to Class 5 shown in Table 3. As shown in FIGS. 7A through 7D and 8A through 8D, among the partial encryption sets Class 1 to Class 5 produced according to the present invention, the partial encryption set Class 3 (20%) have about the same encryption capabilities as a high-protection set (45%) according to a conventional full encryption technique, and the partial encryption set Class 4 (10%) has about the same encryption capability as a low-protection set (30%).

According to the present invention as described above, distortion sensitivity caused by loss of a speech packet can be exactly measured in various embodiments, and partial encryption sets can be efficiently and securely selected based on the measurement result. As a result, the amount of encryption operation is reduced so that encryption services can be applied in various wireless communication environments.

In the drawings and specification, there have been disclosed typical preferred embodiments of the invention and, although specific terms are employed, they are used in a generic and descriptive sense only and not for purposes of limitation. As for the scope of the invention, it is to be set forth in the following claims. Therefore, it will be understood by those of ordinary skill in the art that various changes in form and details may be made therein without departing from the spirit and scope of the present invention as defined by the following claims.

What is claimed is:

1. A computer implemented method of partially encrypting speech packets, comprising the steps of:
    (a) compressing respective speech files stored in a large-capacity speech database in a memory of the computer into the speech packets using a speech codec;
    (b) measuring single-bit loss distortion and sequential-bit loss distortion of the speech packets compressed in step (a);
    (c) generating standards for selecting partial encryption sets based on the measurement results of the single-bit loss distortion and sequential-bit loss distortion;
    (d) selecting the partial encryption sets according to the generated standards; and
    (e) encrypting the speech packets using the selected partial encryption sets.

2. The computer implemented method according to claim 1, wherein step (a) is performed using a G.729 speech codec.

3. The computer implemented method according to claim 1, wherein step (b) is performed using a perceptual evaluation of speech quality (PESQ) algorithm.

4. The computer implemented method according to claim 1, wherein step (c) comprises determining the criticality of each parameter based on not only the measurement results of the single-bit loss distortion and sequential-bit loss distortion but also physical meanings of a plurality of parameters of the speech codec.

5. The computer implemented method according to claim 4, wherein the plurality of parameters comprise a gain parameter, a line spectral pair (LSP) parameter, a pitch parameter, and a residual parameter.

6. A computer apparatus for partially encrypting speech packets, comprising:
    a speech compression unit for compressing respective speech files stored in a large-capacity speech database of a memory of the apparatus into the speech packets using a speech codec;
    a distortion measurement unit for measuring single-bit loss distortion and sequential-bit loss distortion of the compressed speech packets;
    a partial encryption set selecting standard generation unit for generating standards which select partial encryption sets based on the results measured by the distortion measurement unit;
    a partial encryption set selection unit for selecting the partial encryption sets according to the generated standards; and
    an encryption unit for encrypting the speech packets using the selected partial encryption sets.

7. The computer apparatus according to claim 6, wherein the speech compression unit compresses the speech files into the speech packets using a G.729 speech codec.

8. The computer apparatus according to claim 6, wherein the distortion measurement unit measures the single-bit loss distortion and sequential-bit loss distortion of the compressed speech packets using a PESQ algorithm.

9. The computer apparatus according to claim 6, wherein the partial encryption set selecting standard generation unit determines the criticality of each parameter based on not only the measurement results of the single-bit loss distortion and sequential-bit loss distortion but also physical meanings of a plurality of parameters of the speech codec.

10. The computer apparatus according to claim 9, wherein the plurality of parameters comprise a gain parameter, an LSP parameter, a pitch parameter, and a residual parameter.

11. A non-transitory computer readable recording medium for carrying out a method of partially encrypting speech packets, the non-transitory computer readable recording medium comprising:
    coded instructions for compressing respective speech files stored in a large-capacity speech database in a memory of a computer into the speech packets using a speech codec;
    coded instructions for measuring single-bit loss distortion and sequential-bit loss distortion of the compressed speech packets;
    coded instructions for generating standards for selecting partial encryption sets based on the measurement results of the single-bit loss distortion and sequential-bit loss distortion;

coded instructions for selecting the partial encryption sets according to the generated standards; and coded instructions for encrypting the speech packets using the selected partial encryption sets.

12. The non-transitory computer readable recording medium according to claim 11, wherein the coded instructions for compressing the speech packets is performed using a G.729 speech codec.

13. The non-transitory computer readable recording medium according to claim 11, wherein the coded instructions for measuring single-bit loss distortion and sequential-bit loss distortion of the compressed speech packets is performed using a perceptual evaluation of speech quality (PESQ) algorithm.

14. The non-transitory computer readable recording medium according to claim 11, wherein the coded instructions for generating standards for selecting partial encryption sets based on the measurement results of the single-bit loss distortion and sequential-bit loss distortion comprises determining the criticality of each parameter based on not only the measurement results of the single-bit loss distortion and sequential-bit loss distortion but also physical meanings of a plurality of parameters of the speech codec.

15. The non-transitory computer readable recording medium according to claim 14, wherein the plurality of parameters comprise a gain parameter, a line spectral pair (LSP) parameter, a pitch parameter, and a residual parameter.

* * * * *